Sept. 9, 1958 J. E. DUFF 2,850,914
MOTION AND POWER TRANSMITTING DEVICE
Filed March 6, 1956 2 Sheets-Sheet 1

Sept. 9, 1958  J. E. DUFF  2,850,914
MOTION AND POWER TRANSMITTING DEVICE
Filed March 6, 1956  2 Sheets-Sheet 2

United States Patent Office 2,850,914
Patented Sept. 9, 1958

2,850,914

MOTION AND POWER TRANSMITTING DEVICE

Jack E. Duff, Canton, Ohio

Application March 6, 1956, Serial No. 569,755

14 Claims. (Cl. 74—458)

The present invention relates to motion or power transmitting devices and more particularly to a device which may transmit reciprocatory motion to reciprocatory motion, may transmit rotary motion to reciprocatory motion, may transmit a combined rotary and reciprocatory motion to a reciprocatory motion, may transmit a reciprocatory motion to a rotary motion.

The device may be used for actuating switches and other devices simultaneously or in sequence. Many other uses will be obvious to a skilled artisan.

The device of the present invention comprises essentially a member having two intersecting bores for receiving one or more elements having a cylindrical spiral formation formed in their peripheries, the bores being so related that the spiral formations mesh with each other. Thus when one of the spirals is reciprocated the other will be reciprocated at the same rate; when one of the spirals is rotated the other will be reciprocated at a slow rate; and when one of the spirals is both rotated and reciprocated the other will be reciprocated at a faster rate.

Specifically, according to the present invention one or more flexible spirally wound springs are wound in such a manner as to be comparatively stiff axially, that is the pitch and spring constant is quite high in relation to the diameter so as not to collapse axially to any appreciable extent under the axial loads for which they are designed.

According to one modification of the present invention two such springs are placed in intersecting bores in a rigid block with one bore offset from the other so that the spirals of the springs are in mesh with each other. According to this modification movement or power may be applied to one end of one spring and its other end and both ends of the other spring used as motion or power transmitting members, it being noted that since the springs are flexible the movement or power may be transmitted in a direction at an angle to the bores as well as in alignment therewith.

When a reciprocating motion is applied to one end of the one spring a corresponding reciprocating motion will result at its other end and at both ends of the other spring.

When a rotary motion is applied to one end of one spring a corresponding rotary motion will result at its other end while a comparatively slow reciprocating motion will result at both ends of the other spring.

When a combined rotary and reciprocating motion is applied to one end of one spring, a corresponding rotary and reciprocating motion will result at its other end while a faster reciprocating motion will result at both ends of the other spring.

According to a second modification of the present invention a single spring has its opposite ends threaded thru the intersecting bores of the block with the coils of either end in mesh with each other so as to form a closed loop at one side of the block and with the free ends of the spring extending from another side of the block.

A reciprocating motion applied to one of the free ends of the spring will result in a corresponding reciprocating motion at its other end and a corresponding reciprocating movement of the spring forming the loop, the size of the loop remaining the same. Both the end of the spring and the portion of the spring forming the loop may be used to transmit a reciprocating motion.

A rotary motion applied to one end of the spring will result in a combined rotary and slow reciprocating motion at its other end and at the portion forming the loop and those points may be utilized to transmit motion to another object.

A combined rotary and reciprocating motion applied to one end of the spring will produce a corresponding rotary motion and a faster reciprocating motion at the loop and at the other end of the spring which may be utilized to transmit motion at those points.

According to another modification of the invention, a gear having the same peripheral extent as that of the loop of the second modification and provided with teeth to fit the spirals of the spring is placed within the loop of the second modification.

A reciprocating motion applied to one end of the spring will produce a corresponding reciprocating motion at its other end and a rotary motion of the gear the speed of which will depend upon the pitch of the coil and the peripheral extent of the loop which may be varied widely.

It is within the purview of the present invention to provide other variants of the interesting spiral spring arrangement whereby various types of motion may be converted into the same or other type of motion.

Other objects and advantages of the present invention will become apparent as the description proceeds when taken in connection with the accompanying drawings in which.

Figure 2:
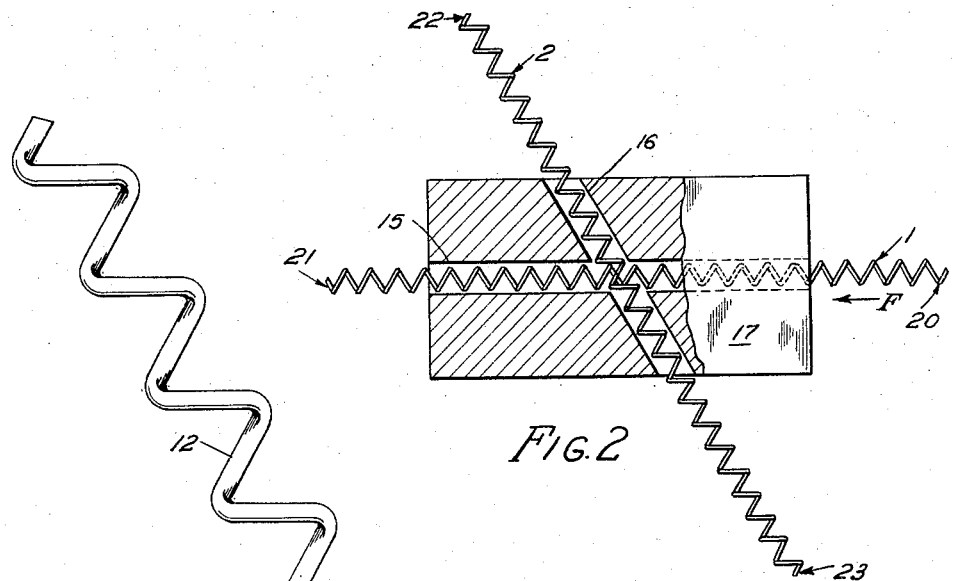
Figure 2 is a view partly in section showing one modification of the present invention.

Referring to the drawings, the reference numeral 10 represents one length or coil of coiled spring and the reference numeral 11 another length or coil which intersects the axis of coil 10 on an axis slightly above the axis of coil 10.

The diameter and pitch of the coils, the diameter and material of the wire may vary widely depending upon the use to which the device is to be put and the extent of the power and motion which is to be transmitted.

Springs having a coil diameter of 0.080 inch and a pitch of 10 turns per inch made from piano wire 0.016 inch in diameter have been found satisfactory for transmitting light loads. The coil should be so made that it will not collapse appreciably axially under the load for which it is designed.

The helix may be right or left hand but as shown it is of the left hand type.

Figure 1:
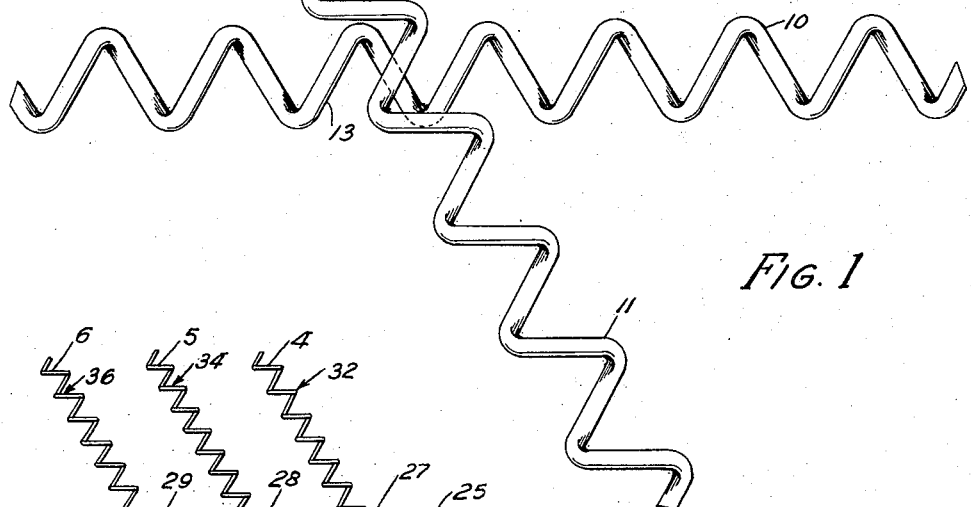
Figure 1 is a schematic view depicting the principles of the present invention.

In the example given the coils are placed across each other with their axes spaced apart approximately 0.022 inch so that the turns of the coils mesh with each other and as shown in Figure 1 the axis of coil 11 is above that of coil 10 with the working sides 12 of its turns substantially parallel to the working sides 13 of coil 10 at the point of intersection, the parallelism of the sides permitting intermeshing of the turns without interference between them. The parallelism of the sides also provides a smoother action between the coils as they are moved relative to each other as will later appear. It is not absolutely essential that the above described parallelism be present but that is the preferred arrangement.

Now if the axes of the coils are held fixed in the position shown in Figure 1, with the turns of the coils intermeshed as shown and the coils free to move axially and to rotate, an axial movement of one of the coils will impart a corresponding axial movement to the other coil without rotation.

Assume that the coil 10 is pushed to the left as viewed in Figure 1. At the point of intersection a side 13 of coil 10 will engage a side 12 of coil 11, and due to the inclination of those sides with respect to the direction of motion, the coil 11 will be pushed upwardly as viewed in Figure 1, at the same speed because of the parallel relationship of the sides 12 and 13.

As the sides 12 and 13 which are in mesh with each other advance and before they move out of mesh, the next adjacent trailing sides come into mesh as the coils 10 and 11 advance.

A rotary movement of one of the coils, it being held against axial movement, will impart an axial movement to the other coil without rotation, at a relative speed depending upon the pitch of the coils. The operation is somewhat the same as a screw and rack gearing.

If the second coil is held against axial movement, the first coil, in addiiton to rotating, will also move axially in the manner of an ordinary screw.

A combined axial and rotary movement of one coil will impart an axial movement to the other coil at a speed in excess of the axial speed of the first coil by an amount equal to the axial movement imparted to it by the rotation of the first coil. The operation is the combination of the movements imparted by a linear movement and a rotary movement of the first coil.

Thus the speed of axial movement that may be imparted to the second coil by movement of the first coil is infinitely variable between pure rotary movement of the first coil at the lower limit and pure axial movement of the first coil at the upper limit.

Neglecting friction, the force applied at one end of either spring may be the same as that imparted to the other spring in the case of pure reciprocatory movement, may be multiplied many times in the case of a pure rotary movement of the first spring and may be infinitely variable between those two limits when a combined rotary and linear motion is imparted to the first spring.

Figure 2 shows one manner by which the principles of the invention may be applied in a useful way to transmit movement or force from one point to a plurality of other points.

The coils 10 and 11 of Figure 1 are in the form of separate springs 1 and 2 free to move axially and to rotate in bores 15 and 16 in a block 17 of metal or other suitable substantially rigid material.

The end 20 of spring 1 may be taken as the point of force application either in the direction of force F or in the reverse direction and the end 21 of spring 1 and the ends 22 and 23 of spring 2 the points of power or movement take off.

The end 20 of spring 1 may be connected to any suitable source of movement or power and the end 21 of spring 1 and the ends 22 and 23 of spring 2 connected to devices to which movement or power is to be transmitted, for example electric switches, shafts, gearing, valves, dials, etc.

A reciprocating motion applied at point 20 will result in a like reciprocating movement at points 21, 22 and 23 which may be attached to push-push or push-pull switches to actuate the three switches in unison. The points 21, 22 and 23 may be connected with any other three devices which require simultaneous operation and a reciprocating motion to actuate them. It is also to be noted that the points 20, 21, 22 and 23 need not be in alignment with the bores 15 and 16 since the springs 1 and 2 are flexible and their ends may be connected to points offset in any direction from the axes of bores 15 and 16.

If it is desired to apply a reciprocating movement or force of a given magnitude to points, 21, 22 and 23, neglecting friction, a force or movement of the same magnitude is applied at the point 20.

If it is desired to apply a rotary movement or force at the point 21 and a reciprocating movement or force at the points 22 and 23 a rotary movement or force is applied at the point 20 with the spring 1 held against axial movement. The force should be of a magnitude which will produce the desired force at points 22 and 23, it being noted that the force at points 22 and 23 will be greater than the force applied at point 20 because of the mechanical advantage of the screw arrangement at the point of intersection of the two springs.

If it is desired to apply a combined rotary and reciprocatory movement at point 21 and a reciprocatory movement at points 22 and 23, a combined rotary and reciprocatory movement is applied at point 20. The movement at point 21 may be converted to a pure reciprocatory movement by the provision of a swivel connection between the spring 1 and the device to be moved. Alternately the movement applied at point 21 may be converted into a pure rotary movement by the provision of a splined connection between the spring and the device to be moved at that point.

The reciprocating movement thus applied at points 22 and 23 will be greater than the reciprocatory movement applied at point 20 by the amount of reciprocatory movement applied to spring 2 by the screw action between the two springs. By varying the amount of either the reciprocatory or rotary movement applied at point 20 and infinite variation in the movement imparted at points 22 and 23 is available with pure rotary movement at point 20 as the lower limit and pure reciprocatory movement as the upper limit.

If spring 2 should be held against axial movement such as by the use of a thrust bearing at its end 22 and a force F is applied to end 20 of spring 1, spring 2 will be rotated clockwise and a rotary motion may be applied to devices at its ends 22 and 23 and a reciprocating motion applied to a device at end 21 of spring 1.

Neglecting friction, the torque developed by spring 2 may be easily calculated and will depend upon the diameter and pitch of the springs 1 and 2. The springs 1 and 2 may be of different diameters so long as the pitch is the same and parallelism between the sides of the turns is maintained. Thus, the torque developed by spring 2 may be varied in that manner also.

Figure 3:
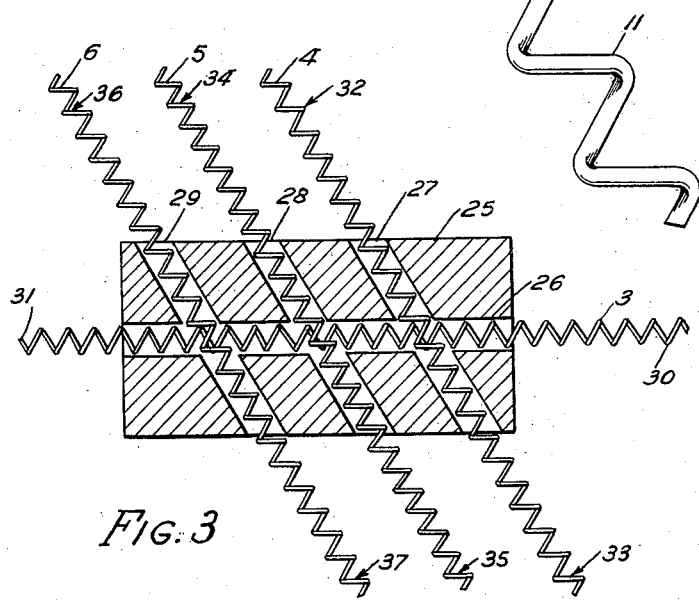
Figure 3 shows how the modification of Figure 2 may be modified to permit a plurality of movements from a single actuator.

Figure 3 shows a modification of the device of Figure 2 by which a plurality of different movements may be applied to different devices by the use of more than one intersecting spring across the spring 1.

A block 25 is provided with a bore 26 and with bores 27, 28 and 29 which intersect the bore 26 in the same manner as the bores of the modification of Figure 2. In this modification, spring 3 is positioned in bore 26 and springs 4, 5 and 6 are positioned in bores 27, 28 and 29, and intermesh with spring 3 in the same manner as spring 2 intermeshes with spring 1 in the modification of Figure 2.

Thus if the spring 3 is reciprocated by application of a force to its end 30, all three springs 4, 5 and 6 will also be reciprocated as well. A corresponding reciprocating motion may be applied to devices at the ends 31, 32, 33, 34, 35, 36 and 37 of the springs 4, 5 and 6.

If the spring 3 is rotated, while being held against axial movement, the springs 4, 5 and 6 will be reciprocated at a lesser speed than when spring 3 is reciprocated. A rotary motion is then transmitted to end 31 of spring 3 and a reciprocating motion imparted to the ends 32, 33, 34, 35, 36 and 37 of the other springs which may be utilized to transmit a reciprocating motion to devices at those points.

If the spring 3 is both rotated and reciprocated, a similar motion will be transmitted to end 31 of spring 3 and a reciprocating motion will be transmitted to ends 32, 33, 34, 35, 36 and 37 of the other springs, the magnitude of which will be greater than when the spring 3 is rotated and less than when the spring 3 is reciprocated as in the modification of Figure 2.

If all of the springs 4, 5 and 6 are held against axial movement and the spring 3 reciprocated, the springs 4, 5 and 6 will rotate and a rotary motion may be utilized at their respective ends.

If only a part of the springs, for example spring 4 is held against axial movement and springs 5 and 6 left free to move axially, and the spring 3 is reciprocated, the spring 4 will rotate and the springs 5 and 6 will reciprocate.

If an axial movement is applied to one of springs 4, 5 or 6, for example spring 5, it will impart an axial movement to spring 3, which in turn will impart an axial movement to springs 4 and 6.

If a rotary motion is applied to one of springs 4, 5 or 6, for example spring 5, a reciprocatory motion will be imparted to spring 3, which in turn will impart a similar reciprocatory motion to the other springs 4 and 6.

The motion thus produced may be applied to devices positioned at the ends of the various springs requiring the type of motion there produced.

It will be obvious that control devices positioned at the ends of the various springs may be actuated by a movement applied to one end of one of the springs.

In each of the above examples the free ends of each of the springs may be used to impart similar movements or forces to devices at those points as explained in connection with the modification of Figure 2.

Figure 4:
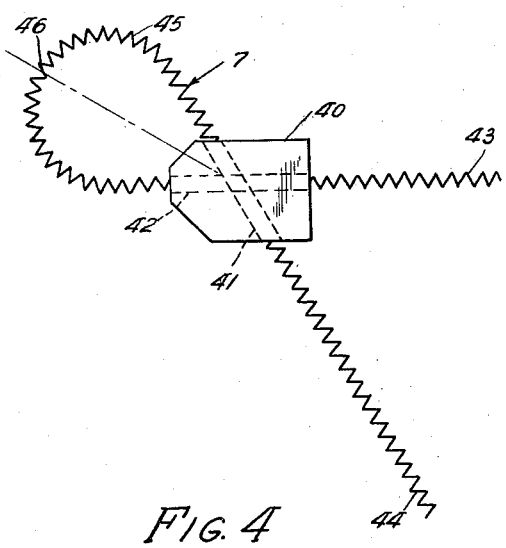
Figure 4 shows another modification of the invention.

Figure 4 shows another practical embodiment by which the principles of the present invention may be utilized for a useful purpose by the use of a single spring 7 having intersecting and intermeshing portions as explained in connection with Figure 1.

A block 40 is provided with intersecting bores 41 and 42 arranged in a manner similar to that explained in connection with Figure 2, thru which is threaded the opposite end portions 43 and 44 of spring 7.

The spring 7 is assembled into the bores 41 and 42 by inserting the ends 43 and 44 into the bores 42 and 41 respectively, at one side of the block 40, so as to form a loop 45. A rotary motion is then applied to the spring forming the loop 45, with the result that the ends 43 and 44 will intermesh with each other and thus be extended to the opposite side of block 40 as shown in Figure 4.

A reciprocating motion applied to either of the end portions will cause a like movement to be imparted to the other portion. If the motion is away from the block, both end portions will move away from the block and the area of loop 45 will decrease. If the motion is toward the block, a like motion will be imparted to the other end portion and both portions will move toward the block resulting in an increase in the area of the loop 45.

In each case the closed end point 46 of loop 45 will be moved in a straight line toward and away from block 40 without any sideward movement because both legs of the loop 45 will be moving in the same direction at the same speed.

The motion imparted to point 46 and the end portion to which the driving force is not applied may be used to actuate controls such as toggle or on-off switches.

The expansion and contraction of the loop 45 may also be used to open and close a squeeze type valve in a compressible tube running thru the loop 45 and one end of the spring 7 utilized to actuate a switch as before.

If a rotary motion is applied to the end portion 43 while it is held against axial movement, a combined rotary and axial movement will be imparted to the end portion 44 as well as to the loop 45 which will decrease in area with the point 46 moving sideward in one direction or the other depending upon the direction of rotation of the end 43.

The end 44 and the point 46 may be used to transmit movement to devices positioned at those points. The expanding and contracting action of loop 45 may also be used to actuate a squeeze type valve as before. It is obvious that the reciprocating movement of the end 44 and loop 45 will be slower than in the case where the end 43 is reciprocated, and that a rotary motion may be transmitted from the end 44 and the point 46 as well as a reciprocating movement.

Figure 5:
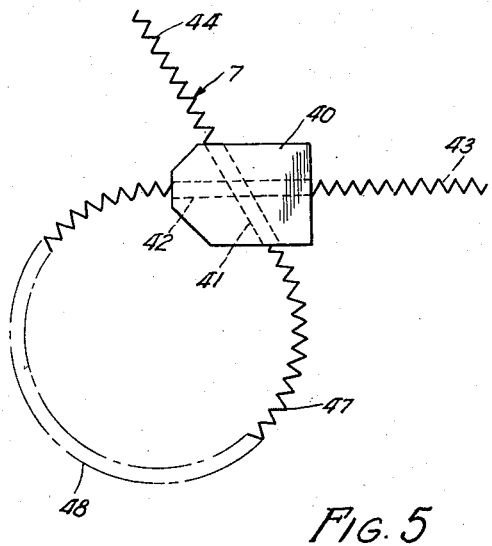
Figure 5 shows how the modification of Figure 4 may be modified to provide a different type of movement; and, Figure 6 shows how the modification of Figure 5 may be used to transmit a rotary motion.

The block 40 and spring 7 of Figure 4 may be utilized to get a different type of movement by changing the arrangement of the spring in the bores 41 and 42. Figure 5 shows such an arrangement.

In Figure 5 the end portion 44 of spring 7 is threaded thru bore 41 in the opposite direction than in Figure 4 to form the closed loop 47.

In such an arrangement, if a force is applied to end portion 43 away from the block 40, the end 44 will move toward the block and the area of loop 47 will remain the same because while one leg of the loop is entering bore 42, the other leg is leaving bore 41 at the same speed.

Any point on loop 47 such as the point 48 may be used to transmit an oscillating movement to a device positioned at that point, while the end 44 may be used to transmit a reciprocating movement to a device positioned at that end of spring 7.

A rotary motion applied to end 43 of spring 7 while held against axial movement, will impart a combined rotary and reciprocating motion to the end 44 and to the point 48 of loop 47 while the area of loop 47 will remain the same. The motion produced at end 44 and point 48 may be transmitted to devices positioned at those points, as is obvious. It is also obvious that the movement producing force may be applied to either end of spring 7.

Figure 6:
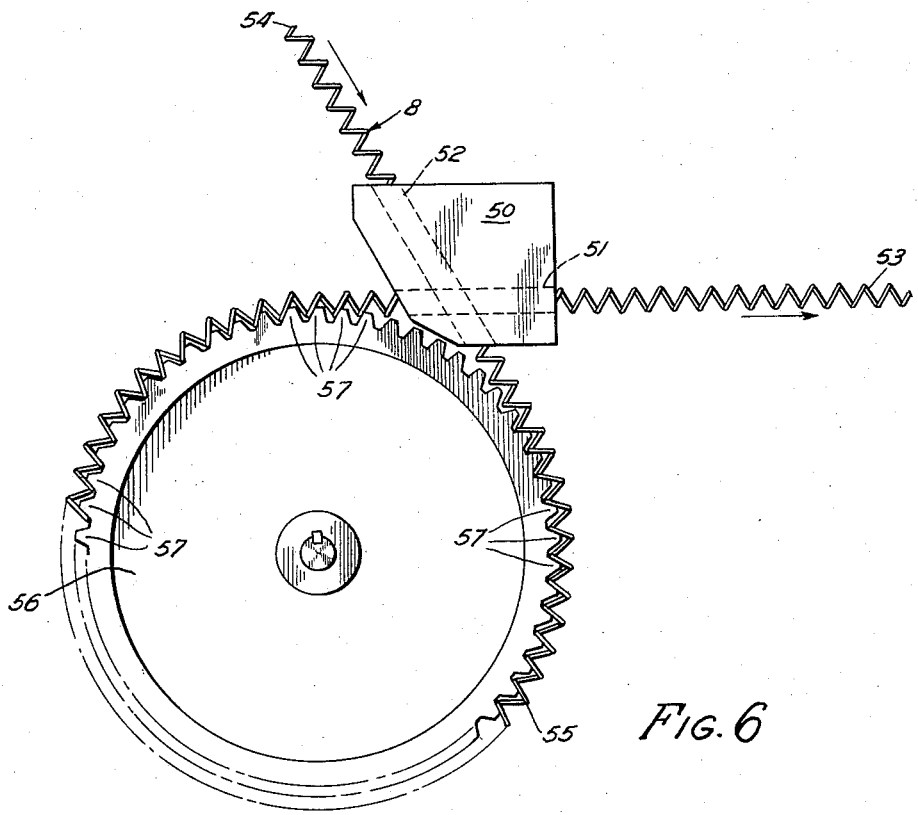

The modification of Figure 5 may be slightly modified and used to transmit a rotary motion to a gear positioned within the loop. Figure 6 shows such a modification.

The block 50 is provided with intersecting bores 51 and 52, arranged as explained in connection with Figure 2, which receive the ends 53 and 54 of a spring 8, the end portions 53 and 54 intermeshing at the intersection of the bores as explained in connection with Figure 1. The spring 8 may be assembled with block 50 in the same manner as explained in connection with Figure 4.

A loop 55 is formed in spring 8 at the opposite side of block 50 from the ends 53 and 54. The loop 55 may be of any suitable diameter, depending upon the extent that the ends 53 and 54 of spring 8 are threaded past each other at the intersection of bores 51 and 52.

A gear 56 having teeth 57 to intermesh with the turns of spring 8, may be positioned within loop 55 and arranged to drive any suitable device.

A reciprocating movement applied to either end of spring 8 will transmit a corresponding movement to the other end, except that such movement will be in an opposite direction with respect to block 50. The diameter of loop 55 will remain the same as in Figure 5 and the gear 56 will be rotated.

It is obvious from the foregoing that the present invention provides a simple arrangement by which a motion or force may be applied at one point and transmitted to other points in the form of a like motion or force or in the form of a different motion or force, It is apparent that many uses for the devices of the present invention, other than those outlined herein, will be obvious to those skilled in the art.

While I have shown but five embodiments of my invention, it is to be understood that those embodiments are to be taken as illustrative only and not in a limiting sense. I do not wish to be limited to the specific structures shown and described but wish to include all equivalent variations thereof, except as limited by the scope of the claims.

I claim:

1. A device of the character described comprising elongate elements of cylindrical helical formation having turns which advance in the same direction, said elements intersecting each other on laterally spaced axes at an angle to each other so that said helical formations are in intermeshing relationship to each other whereby movement of one of said elements will impart movement to the other of said elements by relative movement between said intermeshing spiral formations.

2. A device according to claim 1 in which the turns of the helical formations lie in parallelism with each other in their intermeshing region.

3. A device according to claim 1 in which said elements are formed of cylindrical helically wound springs.

4. A device according to claim 3 including a block of rigid material having intersecting laterally spaced bores in which said elements are positioned with the turns of one of said elements intermeshed with the turns of the other of said elements.

5. A device according to claim 4 in which said elements are in the form of separate cylindrical helically wound springs.

6. A device according to claim 4 in which said elements are formed by the ends of a single cylindrical helically wound spring extending from one side of said block.

7. A device according to claim 6 in which a loop is formed in said spring on a side of said block opposite that from which the ends of said spring extend.

8. A device according to claim 7 in which the helices of said elements are so intermeshed that a reciprocatory movement of one end of said spring will result in a reciprocatory movement of the other end of said spring in the same direction whereby the area of said loop will increase or decrease depending upon the direction of movement of the ends of said spring.

9. A device according to claim 7 in which the helices of said elements are so intermeshed that a reciprocatory movement of one end of said spring will result in a reciprocatory movement of the other end of said spring in the opposite direction whereby the area of said loop will remain the same as the ends of said spring are reciprocated.

10. A device according to claim 9 in which a gear wheel having teeth intermeshing with the turns of said spring is mounted for rotation within said loop whereby a reciprocatory movement of said spring will impart a rotary motion to said gear.

11. A device according to claim 4 in which said block is provided with a plurality of bores intersecting another of said bores and separate springs are positioned in each of said bores whereby axial movement of one of said springs will result in a corresponding axial movement of the other of said springs.

12. A motion and power transmitting device comprising, a block of rigid material formed with intersecting bores, a spring element of cylindrical helical formation positioned in each of said bores, said bores being so related that the turns of said spring elements are in mesh with each other at the intersection of said bores and in such a manner that a reciprocatory movement of one of said spring elements will impart a like reciprocatory movement to springs positioned within said intersecting bores.

13. A device according to claim 12 in which a plurality of bores intersect a single bore and separate spring elements are mounted in each of said bores whereby movement applied to one of said spring elements will impart movement to each of the other of said elements.

14. A device according to claim 12 in which the opposite ends of a single helically wound spring is positioned within said bores and said spring forms a loop on a side of said block different from that from which the ends of said spring extend.

References Cited in the file of this patent

UNITED STATES PATENTS 646,403    Klipfel _____ Mar. 27, 1900